United States Patent [19]
Motokawa et al.

[11] Patent Number: 6,132,545
[45] Date of Patent: *Oct. 17, 2000

[54] METHOD OF PRODUCING AN OPTICAL VIDEO DISC

[75] Inventors: Masaaki Motokawa; Haruhisa Maruyama, both of Yamanashi-ken, Japan

[73] Assignees: Pioneer Electronic Corporation, Tokyo; Pioneer Video Corporation, Yamanashi-ken, both of Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/972,035

[22] Filed: Nov. 17, 1997

[30] Foreign Application Priority Data

Dec. 20, 1996 [JP] Japan ..................................... 8-355375

[51] Int. Cl.⁷ ..................................................... G11B 7/26
[52] U.S. Cl. ........................... 156/155; 156/322; 156/245; 369/283; 369/286
[58] Field of Search .................................. 369/275.1, 283, 369/286; 156/245, 322, 155

[56] References Cited

U.S. PATENT DOCUMENTS 5,268,887 12/1993 Honguh et al. ....................... 369/44.13
5,809,003 9/1998 Taira et al. ............................ 369/275.1

*Primary Examiner*—Michael W. Ball
*Assistant Examiner*—Barbara J. Musser
*Attorney, Agent, or Firm*—Arent Fox Kintner Plotkin & Kahn

[57] ABSTRACT

A method of making a two-disc laminated optical disc, comprises: continuously producing two synthetic resin discs in one injection molding machine using one stamper; forming a reflecting film and a protection film on each synthetic resin disc; and bonding together the two synthetic resin discs by forming an adhesive layer therebetween.

6 Claims, 3 Drawing Sheets

METHOD OF PRODUCING AN OPTICAL VIDEO DISC

BACKGROUND OF THE INVENTION

The present invention relates to a method of producing an optical video disc, in particular to a method in which two discs are bonded together so as to produce a two-disc laminated optical video disc or digital video disc.

A conventional method for producing a two-disc laminated optical video disc may be described as follows.

At first, a stamper formed with numerous information pits is installed in an injection moulding machine, then a predetermined amount of a translucent synthetic resin such as polycarbonate resin or acryl resin is injected into the injection moulding machine. Afterwards, by means of the stamper installed in the injection moulding machine, a disc substrate made of a translucent synthetic resin and having information pits transcribed from stamper, may be produced by virtue of the stamper installed in the injection moulding machine.

Subsequently, with the use of a method called sputterring or a method called vacuum deposition, a reflecting film of aluminium or aluminium alloy is formed on one side (having information pits formed thereon) of the disc substrate. Further, with the use of a method called spin coating, the surface of the reflecting film is coated with an ultraviolet-setting resin and is then irradiated with an ultraviolet light, so as to form a protection film thereon. In this way, an optical disc is thus completed.

Finally, with the use of a roll-coater, an adhesive agent of hot-melting type (hot-melt adhesive) is applied to the surface of the protection film of each disc, then two optical discs each produced in the above-discussed manner are bonded together at their protecting films, thus producing a two-disc laminated optical disc.

Recently, a digital video disc which is compact in size and capable of recording information with high density, is produced also by bonding together two optical discs, using the same method as described above.

On the other hand, in a conventional process for producing a two-disc laminated optical disc having information pits formed on only one disc, one disc containing information pits is produced in one injection molding machine, another disc containing dummy signals is produced in another injection molding machine, then the two discs are bonded together so as to form a two-disc laminated optical disc. Alternatively, a disc containing information pits and a disc containing dummy signals are both produced in an identical injection molding machine but using different stampers, then the two discs are bonded together so as to form a two-disc laminated optical disc.

But, there is at least one problem with the above-described process. Namely, since it is necessary either to employ two different injection molding machines, or to have a time interval between the productions of the two discs if only one injection molding machine is employed but using successively two stampers, there will be a difference in moisture content between the two discs made of synthetic resin. Hence, after the two discs are bonded together, it is apt for the final product (a two-disc laminated optical disc) to suffer from a problem called deformation or warpage.

Particularly, in a case where a digital video disc is manufactured, since a disc substrate has only a thickness of 0.6 mm which results in a week rigidity, it will be further apt for a final disc product to produce a deformation or warpage due to a difference in moisture content between the two discs made of synthetic resin. In order to overcome such a problem, it has been suggested that every two discs are aged for 24 hours, this however is not preferable since productivity will become lower.

SUMMARY OF THE INVENTION

It is an object of the present invention to provide an improved method for efficiently producing a two-disc laminated optical disc without deformation or warpage, so as to solve the above-mentioned problems peculiar to the above-mentioned prior arts.

According to the present invention, there is provided a method of making a two-disc laminated optical disc, comprises: continuously producing two synthetic resin discs in one injection molding machine using one stamper; forming a reflecting film and a protection film on each synthetic resin disc; and bonding together the two synthetic resin discs by forming an adhesive layer therebetween. In detail, each of the synthetic resin discs has a thickness of 0.4–0.8 mm.

According to one aspect of the present invention, the method further comprises a step in which an information surface of one of the two synthetic resin discs, including at least a lead-in area, is made disabled in its reproducibility, by means of thermal treatment.

According to another aspect of the present invention, an information surface of one of the two synthetic resin discs, including at least a lead-in area, is made disabled in its reproducibility, by forming a print indication layer on an outer surface of a two-disc laminated optical disc, said outer surface being corresponding to an area of said one synthetic resin disc including at least said lead-in area.

According to a further aspect of the present invention, an information surface of one of the two synthetic resin discs, including at least a lead-in area, is made disabled in its reproducibility, by omitting the formation of reflecting film on said one synthetic resin disc.

The above objects and features of the present invention will become more understood from the following description with reference to the accompanying drawings.

DETAILED DESCRIPTION OF THE PREFERRED EMBODIMENTS

Figure 1:
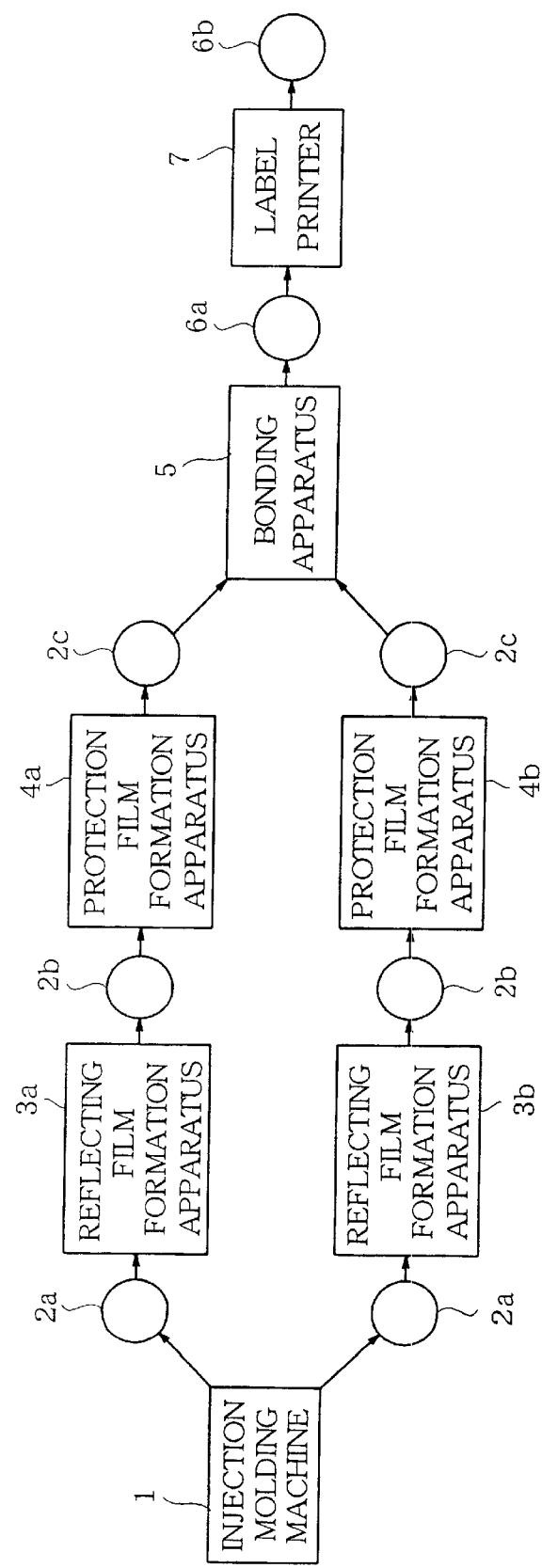
FIG. 1 is a flow chart showing a method for manufacturing a two-disc laminated optical disc, according to a first embodiment of the present invention.

Referring to FIG. 1, in a method according to a first embodiment of the present invention, an injection molding machine 1 for producing a disc substrate includes a fixed metal mold and a movable metal mold. The movable metal mold is movably provided adjacent to the fixed metal mold, and carries a stamper formed with numerous information pits. A predetermined amount of a polycarbonate resin or an acryl resin is injected into the cavities of these metal molds, thus producing a disc substrate 2a having a thickness of 0.4–0.8 mm. Such a disc substrate 2a is excellent in its light transmitting property and has formed on one surface thereof numerous information pits transcribed from the stamper.

Then, the disc substrate 2a produced in the injection molding machine 1 is moved to a reflecting film formation apparatus 3a. With the use of a method called sputterring or a method called vacuum deposition, a reflecting film of aluminium or aluminium alloy is formed on one surface (having information pits formed thereon) of the disc substrate 2a, so as to produce a disc 2b.

Then, the disc 2b is moved to a protection film formation apparatus 4a. The protection film formation apparatus 4a includes a spin coater and a ultraviolet light irradiator. With the use of a method called spin coating, a predetermined amount of a ultraviolet-setting resin is dropped in doughnut-like pattern on to a central area of the surface of the disc 2b. In this way, effected by a centrifugal force, the ultraviolet-setting resin is uniformly applied to the surface of the reflecting film of the disc 2b.

Afterwards, with the use of the ultraviolet light irradiator, the ultraviolet-setting resin uniformly applied on the disc 2b is irradiated with a ultraviolet light, so as to form a desired protection film on the reflecting film of the disc 2b, thus producing a disc 2c.

In fact, the reflecting film formation apparatus 3a and the protection film formation apparatus 4a together form a first process path.

Meanwhile, a same disc substrate 2a produced in the injection molding machine 1 is directed to a second process path, so as to be moved to a same reflecting film formation apparatus 3b and then to a same protection film formation apparatus 4b, thus obtaining a same disc 2c having a same reflecting film and a same protection film, as produced in the above first process path.

In this way, a disc 2c moving from the protection film formation apparatus 4a of the first process path, and another disc 2c moving from the protection film formation apparatus 4b of the second process path, are fed simultaneously to a bonding apparatus 5.

Then, with the use of a method called roll-coating, or a method called screen printing or a method called spin coating, an adhesive agent (comprising an ultraviolet-setting resin made through radical polymerization or cationic polymerization) is applied to the surface of the protection film of each disc 2c. Then, the two discs 2c are bonded together through their protection films. Afterwards, the two discs bonded together are irradiated with an ultraviolet light so that the adhesive layer is hardened, thereby obtaining a two-disc laminated optical disc 6a.

The two-disc laminated optical disc 6a is then moved to a label printer 7, then an offset printing is performed on one surface of the disc 6a, so that a white ink is applied as a primer coating to the entire surface. Subsequently, using three elementary colors and a black ink, a label mark is printed on the disc 6a, thereby producing a completed two-disc laminated optical disc 6b.

In the above method including first and second process paths, a kind of a robot or the like may be employed so that all the disc movements may be performed automatically. For instance, with the use of a kind of a robot or the like, it is possible to perform automatic disc movements from the injection mold machine 1 to the reflecting film formation apparatuses 3a, 3b, from the reflecting film formation apparatuses 3a, 3b to the protection film formation apparatuses 4a, 4b. In this manner, the two disc substrates 2a, 2a produced in the injection molding machine 1 are caused to pass through the same steps including the reflecting film formation and the protection film formation, then are processed in the bonding apparatus 5 and the label printer 7, without any delay.

Figure 2:
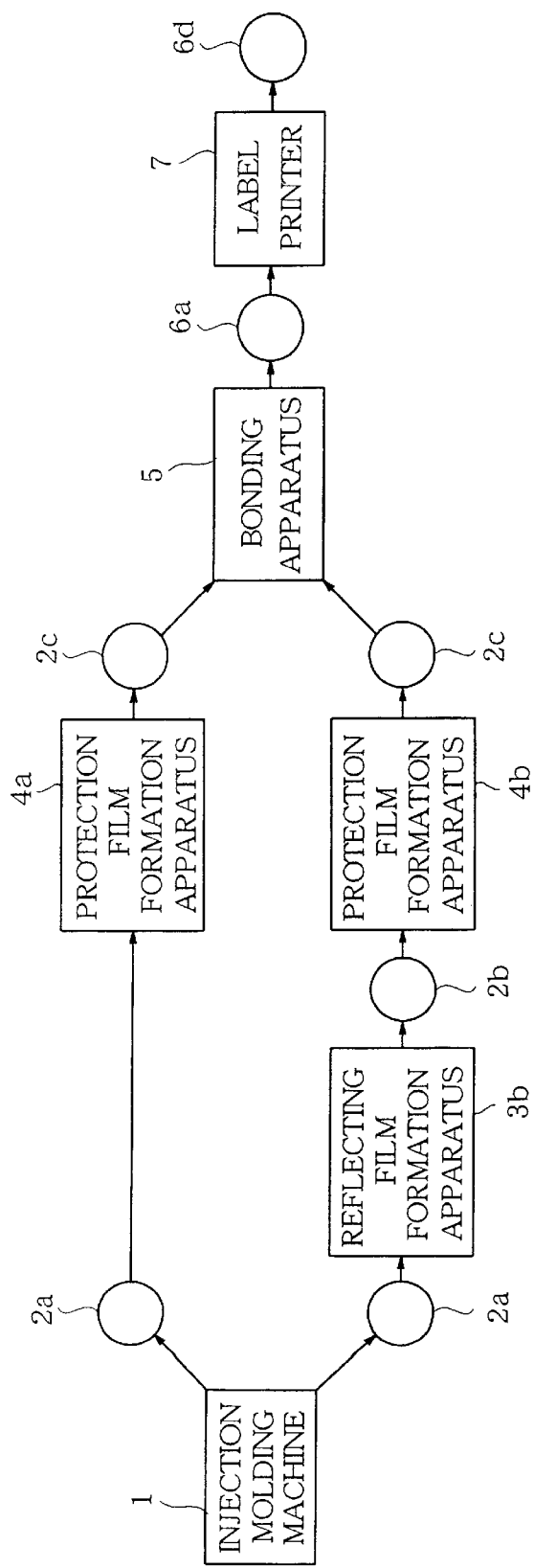
FIG. 2 is a flow chart showing a method for manufacturing a two-disc laminated optical disc, according to a second embodiment of the present invention.

Referring to FIG. 2, in a method according to a second embodiment of the present invention, a step (reflecting film formation) using the reflecting film formation apparatus 3a in the first process path is omitted, which is an only difference between the first and second embodiments of the present invention.

As shown in FIG. 2, in the first process path, a disc substrate 2a produced in the injection molding machine 1 is directly moved to a protection film formation apparatus 4a. Thus, a protection film is directly formed on the disc substrate 2a, producing a dummy disc 2d without a reflecting film.

As shown in FIG. 2, in the second process path, a same disc substrate 2a produced in the injection molding machine 1 is moved to a reflecting film formation apparatus 3b and then to a protection film formation apparatus 4b, thus obtaining a reproducible disc 2c having a reflecting film and a protection film.

The dummy disc 2d produced in the first process path and the reproducible disc 2c produced in the second process path are bonded together in the boning apparatus 5, thus producing a two-disc laminated optical disc 6c with one disc thereof consisting of a dummy disc 2d.

Afterwards, the two-disc laminated optical disc 6c is moved to a label printer 7. Then, similar to the first embodiment of the present invention, an offset printing treatment is performed on the surface of the dummy disc 2d, so that a white ink is applied as a primer coating to the entire surface of the dummy disc. Subsequently, using three elementary colors and a black ink, a label mark is printed on the disc 6c, thereby obtaining a completed two-disc laminated optical disc 6d.

Figure 3:
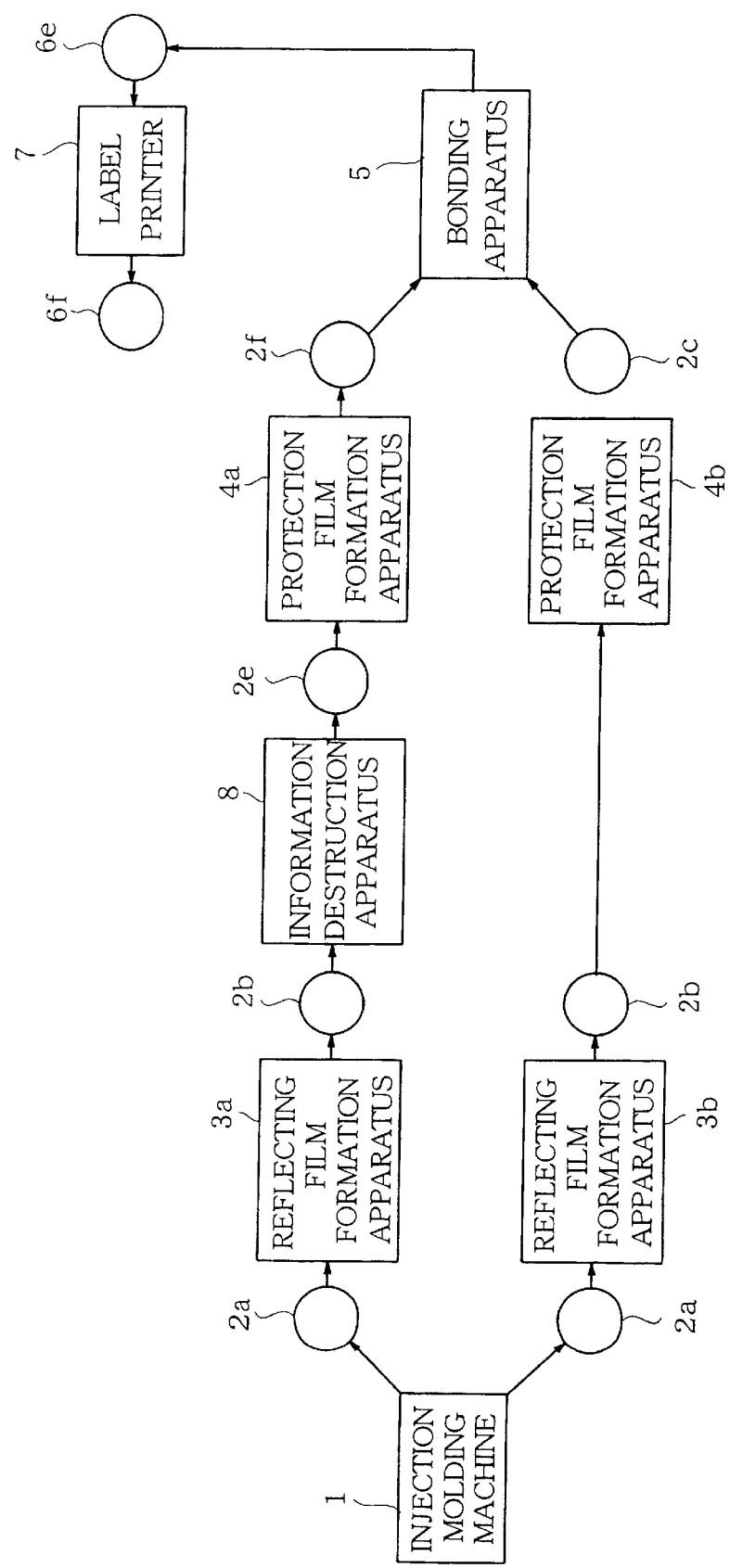
FIG. 3 is a flow chart showing a method for manufacturing a two-disc laminated optical disc, according to a third embodiment of the present invention.

Referring to FIG. 3, in a method according to a third embodiment of the present invention, an information destruction apparatus 8 is provided subsequent to the reflecting film formation apparatus 3a, which is an only difference between the first and third embodiments of the present invention.

As shown in FIG. 3, in a first process path, a disc substrate 2a produced in an injection moulding machine 1 is moved to a reflecting film formation apparatus 3a, so that a reflecting film is formed on one surface (having information pits formed thereon) of the disc substrate 2a, thereby obtaining a disc 2b. Then, with the use of the information destruction apparatus 8, the information surface (having information pits formed thereon) including a lead-in area is thermally destructed, thus forming a disc 2e without any producible information recorded thereon. Then, the disc 2e is moved to a protection film formation apparatus 4b, so that a protection film is formed on the disc 2e, thereby producing a disc 2f with the information surface thereof destructed.

As shown in FIG. 3, in a second process path, a same disc substrate 2a produced in the injection molding machine 1 is moved to a reflecting film formation apparatus 3b and then to a protection film formation apparatus 4b, thus obtaining a reproducible disc 2c having a reflecting film and a protection film.

The disc 2f (having no information pits) produced in the first process path and the reproducible disc 2c produced in the second process path are bonded together in the boning apparatus 5, thus producing a two-disc laminated optical disc 6e with one disc thereof being a disc 2f having no information pits.

Afterwards, the two-disc laminated optical disc 6e is moved to a label printer 7. Then, similar to the first and second embodiments of the present invention, an offset printing treatment is performed on an outer surface of the disc 6e corresponding to an area of the disc 2f (having no information pits but containing at least the lead-in area), so that a print indication layer is formed thereon. Subsequently, a label mark is printed on the disc 6e, thereby obtaining a completed two-disc laminated optical disc 6f.

With the use of the present invention, it is possible to achieve at least such an effect as described in the following. Namely, since two disc substrates are allowed to be produced in only one injection moulding machine using an identical stamper, and then the two discs are bonded together upon passing through the two process paths, the two disc substrates have a same moisture content, thereby enabling a final product (two-disc laminated optical disc) to prevent any possible deformation or warpage.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A method of producing a two-disc laminated optical disc, comprising:

continuously producing two synthetic resin discs in one injection molding machine using one stamper;

continuously moving one synthetic resin disc through a first process path equipped with a reflecting film formation apparatus and a protection film formation apparatus, and simultaneously continuously moving the other synthetic resin disc through a second process path equipped with a reflecting film formation apparatus and a protection film formation apparatus, thereby continuously forming a reflecting film and a protection film on each synthetic resin disc; and bonding together the two synthetic resin discs by forming an adhesive layer therebetween.

2. The method according to claim 1, wherein each of the synthetic resin discs has a thickness of 0.4–0.8 mm.

3. The method according to claim 1 or 2, further comprising a step in which an information surface of one of the two synthetic resin discs, including at least a lead-in area, is made disabled in its reproducibility.

4. The method according to claim 3, wherein an information surface of one of the two synthetic resin discs, including at least a lead-in area, is made disabled in its reproducibility, by forming a print indication layer on an surface of a two-disc laminated optical disc, said surface being corresponding to an area of said one synthetic resin disc including at least said lead-in area.

5. The method according to claim 3, wherein an information surface of one of the two synthetic resin discs, including at least a lead-in area, is made disabled in its reproducibility, by means of thermal treatment.

6. A method of producing a two-disc laminated optical disc, comprising:

continuously producing two synthetic resin discs in one injection molding machine using one stamper;

continuously moving one synthetic resin disc through one process path equipped with a reflecting film formation apparatus and a protection film formation apparatus, and simultaneously continuously moving the other synthetic resin disc through another process path not equipped with a reflecting film formation apparatus but equipped with a protection film formation apparatus, thereby forming a reflecting film and a protection film on said one synthetic resin disc but forming only a protection film on the other synthetic resin disc; and bonding together the two synthetic resin discs by forming an adhesive layer therebetween, wherein the synthetic resin disc without a reflecting film formed thereupon is disabled in its reproducability.

* * * * *